United States Patent [19]

Jorgensen

[11] 3,764,039
[45] Oct. 9, 1973

[54] CLOSURE ASSEMBLY FOR PRESSURE VESSELS

[76] Inventor: Svend M. Jorgensen, 90 Prospect Ter., Tenafly, N.J.

[22] Filed: Aug. 12, 1971

[21] Appl. No.: 171,224

[52] U.S. Cl.................................. 220/55 A, 220/3
[51] Int. Cl............................................ B65d 55/24
[58] Field of Search................... 220/3, 24 R, 24 B, 220/29, 46 R, 46 MS, 55 R, 55 F, 55 A, 55 D

[56] References Cited
UNITED STATES PATENTS

| | | | |
|---|---|---|---|
| 3,478,920 | 11/1969 | Pechacek | 220/3 |
| 3,398,853 | 8/1968 | Jorgensen | 220/46 R |
| 3,313,599 | 4/1967 | Boon | 220/46 R |
| 3,620,405 | 11/1971 | Peters | 220/29 |
| 1,317,045 | 9/1919 | Shawley | 220/24 B |
| 3,393,820 | 7/1968 | Fuchs | 220/3 |
| 3,464,581 | 9/1969 | Polcer | 220/3 |

Primary Examiner—George E. Lowrance
Attorney—John Maier et al.

[57] ABSTRACT

A closure assembly for a vessel, wherein a ring assembly is mounted between a disc and the vessel wall to close one end portion of the vessel. The ring assembly is connected to the vessel wall and to the disc by means of threaded shear studs.

6 Claims, 6 Drawing Figures

Patented Oct. 9, 1973

INVENTOR
SVEND D JORGENSEN

INVENTOR
SVEND D. JORGENSEN

INVENTOR
SVEND D. JORGENSEN 3,764,039

CLOSURE ASSEMBLY FOR PRESSURE VESSELS

BACKGROUND OF THE INVENTION

This invention relates to a vessel, and more particularly to a pressure vessel in which a closure assembly is removably connected to one end portion of the vessel.

In process plants and other environments which require high-pressure vessels, many of these vessels, such as reactors, converters, etc., require full-size end openings having closures which are removable to permit insertion and withdrawal of external materials, equipment, etc. With the increasing use of relatively large vessels of this type having inner diameters in excess of 15 feet, the closures for such vessels must have a thickness in excess of 50 inches and a weight in excess of 500,000 pounds. It can be appreciated that not only is it extremely difficult to manufacture a unitary closure of this size, but that any closure of such size and weight would be extremely difficult to handle and transport, as well as assemble and disassemble in the field.

These problems are compounded in the use of closure designs that require the diameter of the closure to exceed that of the vessel in order to provide for a connection between the two units.

SUMMARY OF THE INVENTION

It is therefore an object of the present invention to provide a closure assembly for a pressure vessel which is made up of a plurality of component parts that can be easily handled, transported, assembled, and disassembled.

It is a further object of the present invention to provide a closure assembly of the above type which extends within the open end of the vessel and which is connected to the vessel wall by means of shear studs in order to keep the size and the weight of the closure to a minimum.

Towards the fulfillment of these and other objects, the closure assembly of the present invention comprises disc means extending within said vessel, ring means extending within said vessel and between said disc means and the inner wall of said vessel, and connecting means for connecting said ring means to said disc means and to said vessel.

DESCRIPTION OF THE PREFERRED EMBODIMENTS

Figure 1:
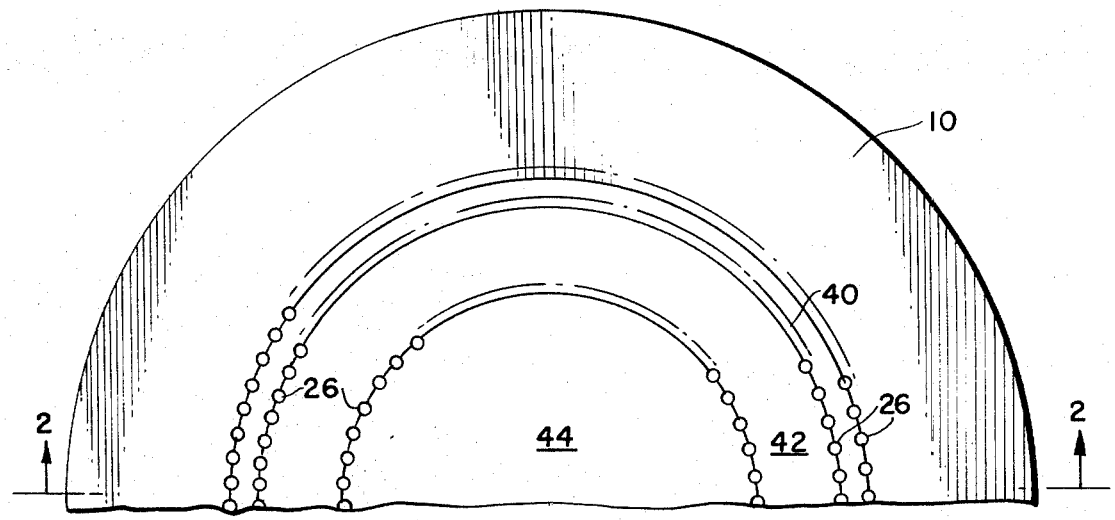
FIG. 1 is a partial top-plan view of one embodiment of the closure assembly of the present invention shown mounted in a pressure vessel.
Figure 2:
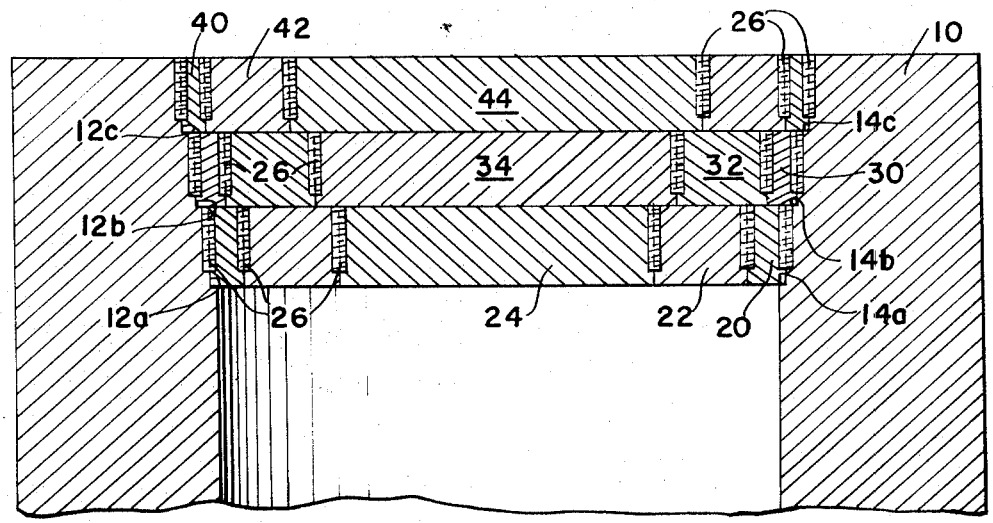
FIG. 2 is a cross-sectional view taken along the line 2—2 of FIG. 1.

Referring specifically to the embodiment of FIGS. 1 and 2, the reference numeral 10 refers to a pressure vessel having one end which receives the closure assembly of the present invention. Three consecutive counterbores 12a, 12b, and 12c of a varying diameter are formed in the open end of the vessel 10, thus defining three stepped cylindrical shoulders 14a, 14b, and 14c. Since the vessel 10 may otherwise be of a conventional design with respect to size, structure, etc., it will not be described in any further detail.

The closure assembly is comprised of three abutting layers of varying diameters each consisting of an outer ring, an inner ring, and a disc disposed within the inner ring. In particular, the lower layer is formed of an outer ring 20 extending in the counterbore 12a and supported by the shoulder 14a, with the ring having an outer diameter slightly less than the inner diameter of the counterbore. An inner ring 22 is nestled within the outer ring 20, with the outer diameter of the ring 22 being slightly less than the inner diameter of the ring 20. A solid disc 24 extends within the ring 22, with the outer diameter of the disc being slightly less than the inner diameter of the ring.

A plurality of threaded shear studs 26 are formed in a corresponding number of circumferentially spaced, tapped bores extending along the interfaces between the ring 20 and the counterbore 12a, the ring 22 and the ring 20, and the disc 24 and the ring 22, to fasten the components together and thus impart structural integrity to the layer. Although the shear studs 26 and their corresponding tapped bores are shown of a length that is slightly less than the thickness of the rings 20 and 22 and the disc 24, it is understood that these lengths can vary in accordance with particular design requirements.

The intermediate layer is of a slightly larger diameter than the lower layer and is formed in an identical manner by a pair of rings 30 and 32 and a disc 34, with the ring 30 extending in the counterbore 12b and an additional group of shear studs 26 fastening the ring 30 relative to the wall of the vessel 10, the ring 32 relative to the ring 30, and the disc 34 relative to the ring 32. The upper layer of the closure assembly is of a slightly larger diameter than the intermediate layer and is formed in an identical manner by a pair of rings 40 and 42 and a disc 34 which are fastened relative to the counterbore 12c and have their upper surfaces extending flush with the upper end of the vessel 10.

In assembly, the bottom layer, consisting of the rings 20 and 22 and the disc 24, is initially inserted in the counterbore 12a and fastened relative to the vessel, followed by insertion and fastening of the intermediate layer consisting of the rings 30 and 32 and the disc 34, and insertion and fastening of the upper layer consisting of the rings 40 and 42 and the disc 44, with the combined thicknesses of the various layers forming the required total thickness of the closure assembly to withstand the pressures in the vessel.

It is apparent that the above arrangement permits the various components, including the rings, discs, and shear studs, to be packaged, shipped, and assembled individually, with the assembly of the closure being relatively simple. Access to the interior of the vessel 10 is attained after assembly of the closure by simply removing the disc 44 and then removing the disc 34 and the disc 24.

Figure 3:
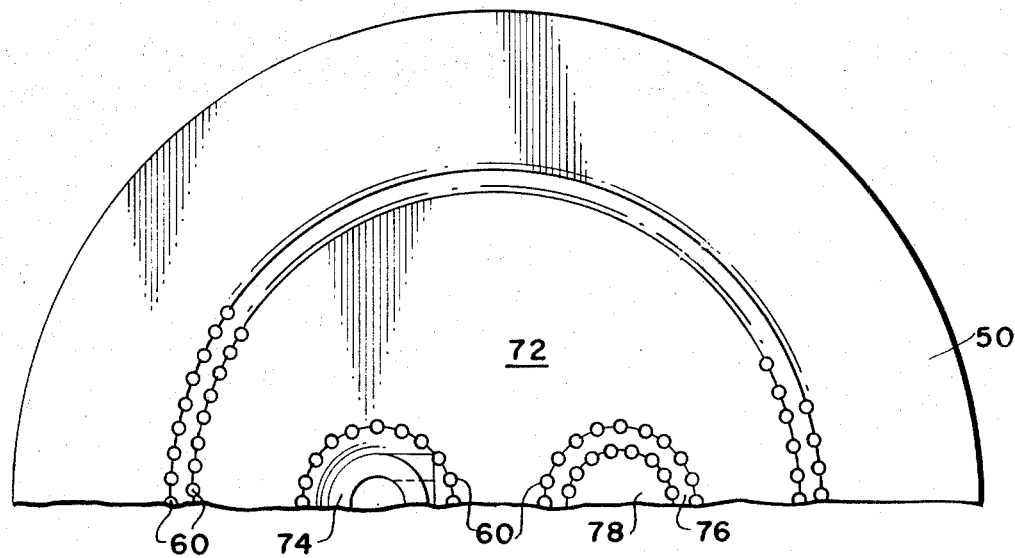
FIGS. 3 and 4 are views similar to FIGS. 1 and 2, respectively, but depicting another embodiment of the present invention.
Figure 4:
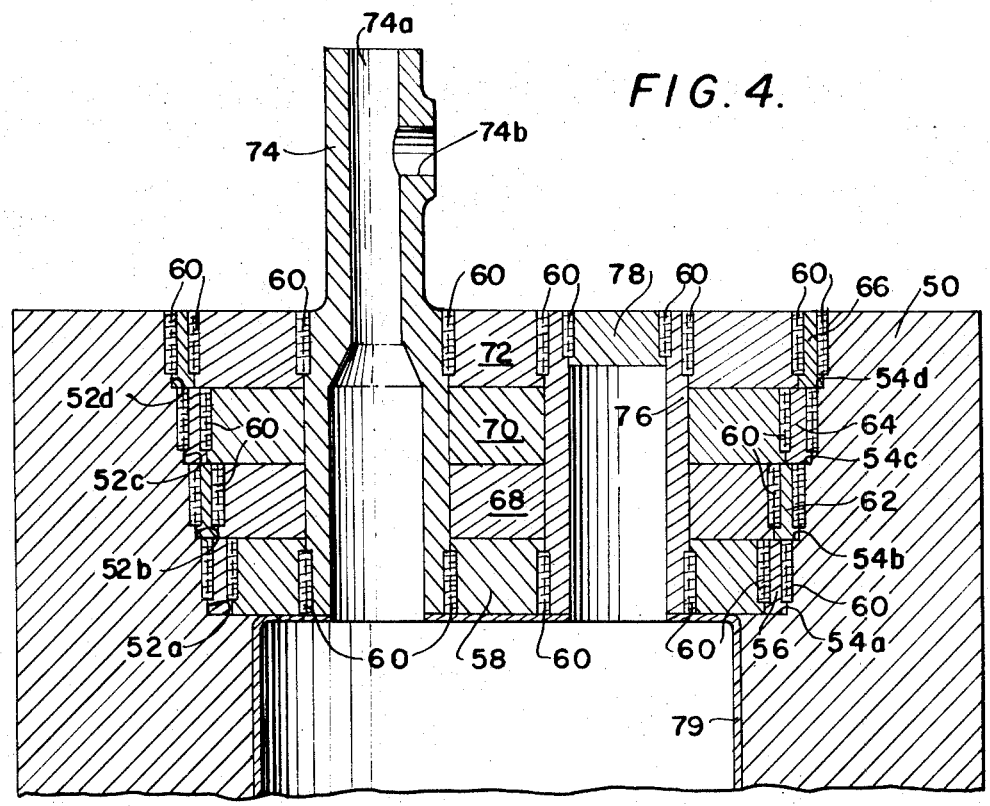

In the embodiment of FIGS. 3 and 4, the closure assembly is in the form of a four-layer assembly provided with two access cylinders. In particular, a vessel 50 is provided with four successive counterbores 52a–52d of a varying diameter formed in the upper end portion thereof to form a plurality of stepped shoulders 54a–54d, respectively. Each layer of the closure assembly is comprised of an outer ring which is inserted into its respective counterbore and fastened relative to the vessel wall, and a disc nestled within the ring. In particular, the lower layer is formed by a ring 56 which extends within the counterbore 52a and rests on the shoulder 54a, and a disc 58 nestled within the ring 56, with the ring 56 having a slightly smaller outer diameter than the diameter of the counterbore 52a, and the disc 58 having a slightly smaller diameter than the inner diameter of the ring 56. The ring 56 is fastened relative to the vessel wall, and the disc 58 is fastened relative to the ring 56, by means of a plurality of shear studs 60 extending in circumferentially spaced tapped bores formed along the interfaces between the respective components. The additional layers are formed in a similar manner by a plurality of outer rings 62, 64, and 66 having a varying diameter corresponding to the diameter of the counterbores 52b, 52c, and 52d, respectively, and discs 68, 70, and 72 extending within the rings 62, 64, and 66, respectively. As in the bottom layer, the rings of the remaining layers are fastened relative to their respective counterbores, and the discs with respect to their respective rings, by means of a plurality of shear studs 60 extending in spaced tapped bores formed along the interfaces between the respective components.

Each disc 58, 68, 70, and 72 has two openings therein which are coaligned to form two through openings through the entire assembly which receive two cylinders 74 and 76. The cylinder 74 has a portion extending outwardly from the upper surface of the disc 72, and is fastened relative to the discs 72 and 58 by means of a plurality of shear studs 60 extending in spaced tapped bores formed along the interface between the cylinder and the respective discs. The cylinder 74 has a through bore terminating in an end portion 74a, with a radial bore 74b communicating with the through bore to provide two different access openings for connection to external equipment such as pipes, etc., it being understood that valves, or the like, will be provided to control the flow of fluid or the like to and from the vessel.

The cylinder 76 is of a length corresponding to the thickness of the closure assembly and is fastened relative to the discs 58 and 72 by means of a plurality of shear studs 60 in a manner identical to the cylinder 74. A removable plug 78 closes the upper end of the cylinder 76 and is fastened to the inner wall thereof by means of a plurality of shear studs 60. This arrangement permits easy access to the interior of the vessel 50 while not permanently destroying the structural integrity of the closure assembly. A seal plate 79 extends over the inner wall of the vessel 50 and has a horizontal portion abutting the lower surface of the disc 58, with openings being provided in the seal plate registering with the cylinders 74 and 76.

The closure assembly of FIGS. 3 and 4 is assembled relative to the vessel 50 by initially inserting the outer ring 56 of the lower layer into the counterbore 52a and fastening same relative to the vessel wall by means of the shear studs 60, followed by the insertion of the disc 58 in the ring 56 and a similar fastening therebetween by means of the shear studs. The successive layers are then built up on top of the lower layer in a similar manner, after which the cylindrical members are inserted through the openings defined by the respective discs and are fastened to the discs by means of the shear studs 60, followed by an insertion and fastening of the plug 78 in the cylinder 76.

Figure 5:
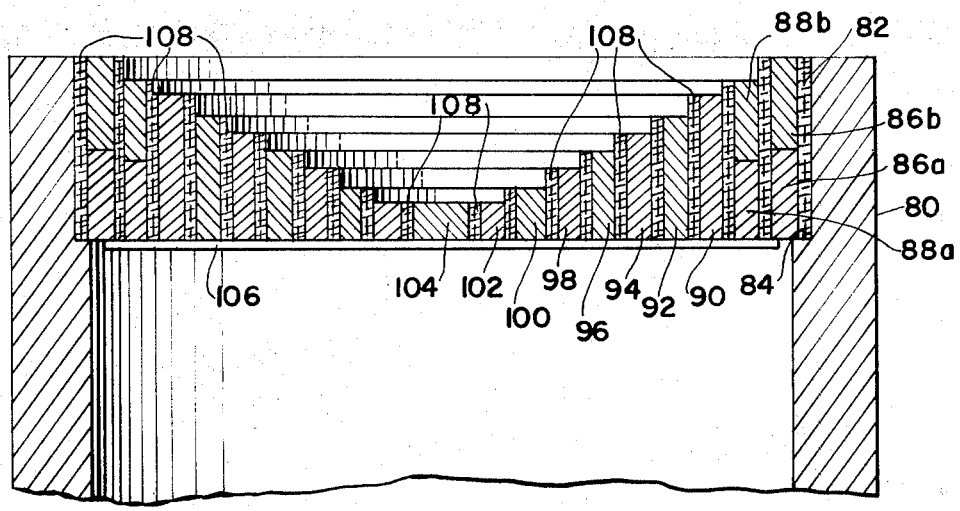
FIGS. 5 and 6 are views similar to FIGS. 2 and 4, but depicting additional embodiments of the present invention.

In the embodiment of FIG. 5 a vessel wall 80 has a single counterbore 82 formed in its upper end to define a shoulder 84. An outer ring assembly comprising two stacked rings 86a and 86b, is disposed in the counterbore 82 with the ring 86a resting on the shoulder 84. Likewise, a pair of stacked rings 88a and 88b extend within the rings 86a and 86b, and a plurality of concentric rings 90, 92, 94, 96, 98, 100, and 102, of a varying diameter, are nestled, one within the other, inside the rings 88a and 88b. The assembly is completed by a disc 104 which extends within the ring 102 and a seal plate 106 welded to the flat bottom surface defined by the various components. As in previous embodiments, a plurality of shear studs 108 are formed in circumferentially spaced, tapped bores formed between the interfaces between the rings 86a and 86b and the counterbore 82, between the adjacent rings, and between the disc 104 and the ring 102, to fasten the adjacent components together and thus form the complete assembly. In order to minimize the size and weight of the assembly, the thickness, or depth, of the various rings, including the two outer ring assemblies, varies in accordance with their particular radial location relative to the vessel. In particular, the ring 102 is of a lesser thickness than the ring 104, while the ring 104 is of a lesser thickness than the ring 106, and so on. This is possible because the stress concentration of a given inner ring is less than on a given outer ring, due to the fact that the load on a particular ring increases in direct proportion to its radial distance from the center of the assembly. In this manner, the materials utilized and the resulting weight of the entire assembly are reduced substantially.

Figure 6:
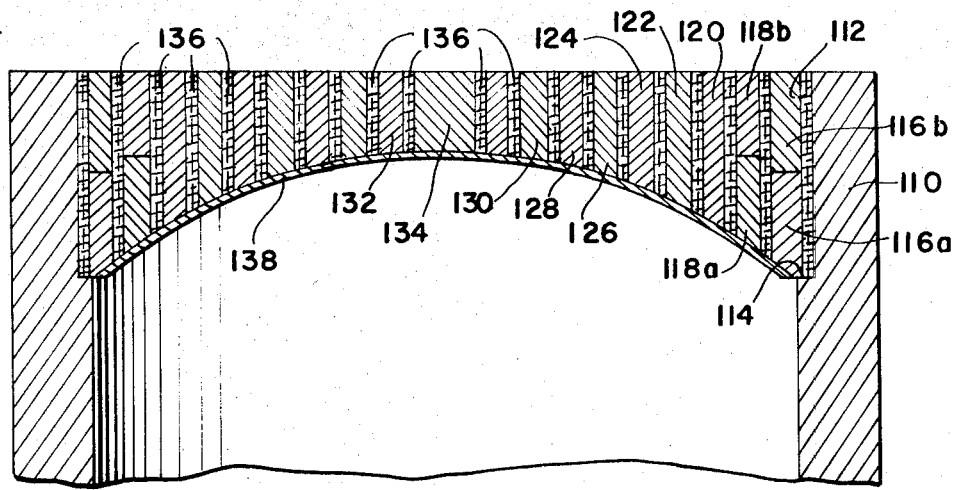

The embodiment of FIG. 6 is similar to that of FIG. 5, but the rings are arranged so that they define a flat upper surface and a hemispherical lower surface. In particular, the wall of a vessel 110 is provided with a counterbore 112 which defines a shoulder 144. A ring assembly comprising a lower ring 116a and an upper ring 116b extends within and immediately adjacent the counterbore 112, with the lower ring 116a resting on the shoulder 114. An intermediate ring assembly comprising a pair of rings 118a and 118b extends immediately within the ring assembly formed by the ring portions 116a and 116b, and a plurality of concentric rings 120, 122, 124, 126, 128, 130, and 132, of a varying diameter, are nestled, one within the other, inside the rings 118a and 118b, with a disc 134 extending within the ring 132. As in previous embodiments, a plurality of shear studs 136 attach the rings 116a and 116b to the wall of the vessel 110, the respective adjacent rings to each other, and the disc 134 to the ring 132, with the shear studs being formed in spaced tapped bores formed along the interfaces of the adjacent components.

As can be appreciated from a view of FIG. 6, the thickness of the rings increases in proportion to their distance from the center of the assembly. In particular, the ring 132, for example, is of less thickness than the ring 120, and so on, since the load on the inner rings is less than the load on the outer rings. The outer surfaces of the components define a flat surface, while their lower surfaces take a substantially hemispherical pattern. A substantially hemispherical seal plate 138 is welded to the bottom surfaces of the components.

The advantages of the closure assembly of the various embodiments above are numerous. For example, the machining tolerances required for the various counterbores in the vessel wall, along with the tolerances of each ring and disc, are not critical, since the shear studs can accomodate a relatively high range of variances.

Of course, in addition to providing substantial assembly shipment, and disassembly convenience, the closure assembly of the present invention permits easy removal of various portions of the assembly for access to the interior of the vessel for repairs, etc. Of course, and as emphasized above, the use of a flat head also minimizes the amount of material and weight of the closure assembly.

Of course, several variations may be made in the foregoing without departing from the scope of the invention. For example, the number of layers employed, plus the number of ring portions making up a single layer, may be varied in accordance with particular design requirements.

Of course, other variations of the specific construction and arrangement of the closure assembly disclosed above can be made by those skilled in the art without departing from the invention as defined in the appended claims.

I claim:

1. A vessel comprising a hollow cylindrical member having one open end; and a closure assembly for said cylindrical member, said closure assembly comprising a plurality of stacked discs coaxially aligned with each other and with said cylindrical member, said discs extending within said open end with the outermost disc extending flush with said open end, the diameters of said discs being successively reduced from said outermost disc to the innermost disc, and the outer diameter of each of said discs being less than the inner diameter of the wall of said cylindrical member to define spaces therebetween, ring means extending in the spaces between said disc and said wall, a plurality of tapped bores being formed along the interface between said ring means and said wall and between said discs and said ring means, and a shear stud extending in each tapped bore to secure said ring means to said wall and discs to said ring means.

2. The vessel of claim 1 wherein a plurality of successive counterbores of varying diameters are disposed in said wall, said ring means comprising a plurality of individual rings extending between a corresponding disc and a corresponding counterbore.

3. The vessel of claim 2 wherein there is a series of rings extending between each disc and a corresponding counterbore, the rings of each series being concentric and being nestled one within the other, with a plurality of spaced tapped bores being formed along the interface between the adjacent rings of each series, and further comprising a shear stud extending in each of said bores to secure said rings together.

4. The assembly of claim 1 further comprising means defining at least one opening through said discs to permit access to the interior of said vessel.

5. A vessel comprising a hollow cylindrical member having one open end; and a closure assembly for said cylindrical member, said closure assembly comprising a plurality of concentric rings extending within said open end, said rings being of varying diameters and being nestled one within the other, the thicknesses of said rings being successively reduced from the outermost ring to the innermost ring, at least one of said rings being formed by two half portions, a plurality of tapped bores being formed along the interface between said outermost ring and the wall of said cylindrical member and between the adjacent rings, and a shear stud extending in each tapped bore to secure said outermost ring to said wall, said adjacent rings to each other and said half portions to each other.

6. The vessel of claim 5 further comprising a disc extending within the opening in the innermost ring and means for securing said disc to said ring.

* * * * *